W. LEES.
Corn-Planter.
No. 25,425.
Patented Sept. 13, 1859.
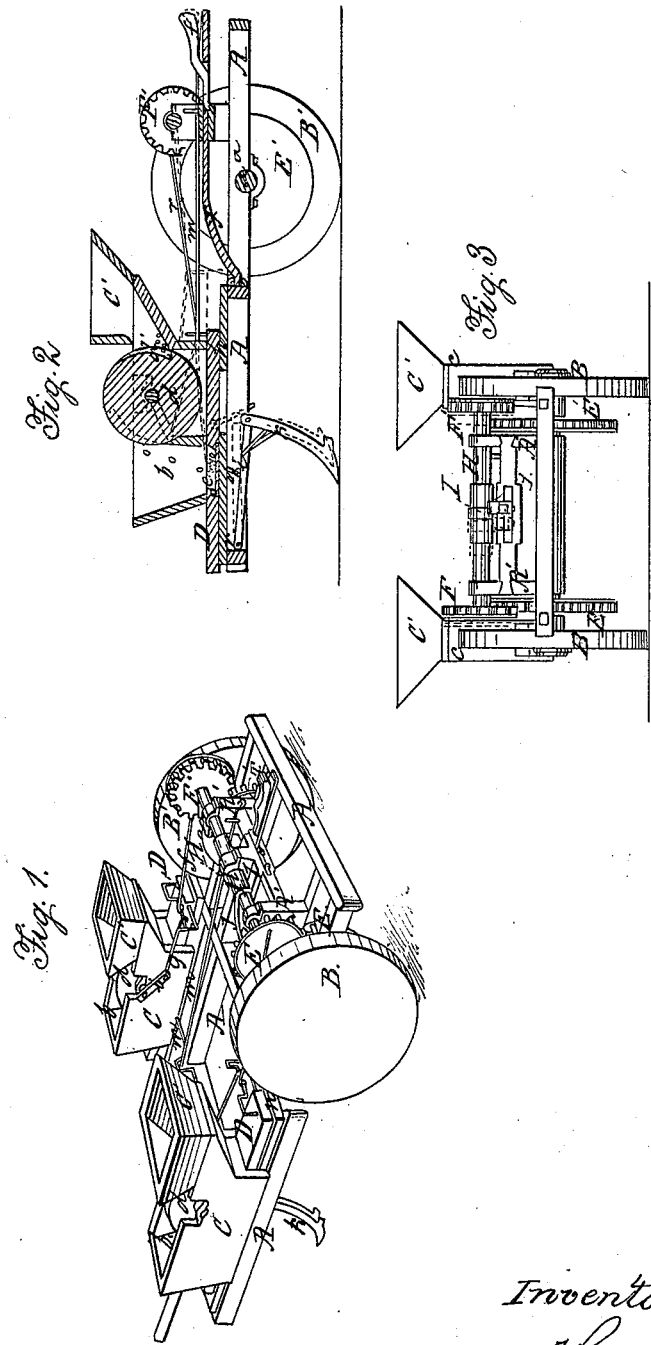
Witnesses:
Inventor
William Lee

UNITED STATES PATENT OFFICE.

WILLIAM LEES, OF GERMANTOWN, OHIO.

IMPROVEMENT IN CORN-PLANTERS.

Specification forming part of Letters Patent No. 25,425, dated September 13, 1859.

*To all whom it may concern:*

Be it known that I, WILLIAM LEES, of Germantown, in the county of Montgomery and State of Ohio, have invented a new and useful Improvement in Corn-Planters; and I do hereby declare that the following is a full and clear description thereof, reference being had to the accompanying drawings, and to the letters of reference marked thereon, and made to form a part of this specification.

The nature of my invention relates, first, to a device for feeding and dropping the corn or other seed which is to be planted.

In reference to the accompanying drawings Figure 1 is a perspective view of the planter with all its parts arranged for operation. Fig. 2 is a longitudinal sectional elevation, showing specially the arrangement of the feeding and dropping device and the provision for adjusting the plows. Fig. 3 is an end view of the planter, showing the provision for regulating the dropping of the corn.

A represents the frame-work of the planter, arranged upon wheels B B'. The wheel B is secured permanently to the axle-tree $a$, and is made to rotate in harmony therewith. The wheel B' is made to rotate upon the axle-tree, by means of which the turning of the planter is facilitated.

C C are seed-boxes, the arrangement of which is fully shown in Fig. 2, their rear ends being formed with feeding-hoppers C' and their forward with seeding-hoppers $b$. Within the boxes $c$ are arranged oscillating cylinders $d$, formed with seed-cups $d'$ in such manner with reference to the hoppers $c'$ $b$ that the seed to be planted may be conveyed from hoppers C' to hoppers $b$ in the proper quantity for planting each hill or deposit of corn, as shown clearly in Fig. 2.

D is a sliding feed-bar formed with an aperture, $e$, at the bottom of which is arranged a hinged valve, $e'$, in such manner as to fall when the feed-bar D is retracted to the proper position for depositing seed, as shown by red lines in Fig. 2, and as the bar D is again forced forward the valve $e'$ will be closed by coming in contact with the bed $h$ of the box $c$. The cylinders $d$ and feed-bars D are operated by means of the driving-wheel B through the medium of cog-wheels E E' F F', rods $f$ $g$, and crank $i$.

Attached to the axle-tree $a$ are driving cog-wheels E E', the wheel E" being formed of a diameter somewhat greater than the wheel E.

H is an adjustable shaft having bearings in the posts A' of the frame A, and being clasped by the movable box I. Attached to the shaft H are cog-wheels F F', the wheel F being of a diameter somewhat greater than the wheel F', so that when the planter is operating with the wheels F' E' in gear the spaces between the deposits of seed will be less than when the wheels E F are in gear, and vice versa. The shaft H is adjustable laterally in such manner as to throw the wheels F F' in and out of gear by means of the hinged lever J, which is provided with a spring-stop, $j$, by means of which the desired position of the shaft H may be secured.

The plows $k$ are attached to beams $l$, which are hinged to the frame A at $l'$ in such manner as to allow vertical motion to the plows. These plows $k$ are adjustable with reference to their depth in the soil or their elevation above it by means of the crank-rod $m$ and rod $m'$, so that the operator may readily adjust the plows to a proper depth in the soil, or may elevate them above the surface of the ground when it may be required to turn the planter or drive it across the field without planting.

The cog-wheel E is formed of a diameter somewhat less and is provided with one cog less than the wheel E', and the cog-wheel F is formed of a diameter somewhat greater and is provided with one cog more than the wheel F', so that by operating the seeding device with the wheels E F in gear the corn may be deposited with a greater distance between the hills than when the wheels E' F' are in gear, thereby enabling the operator to regulate the depositing of seed in such manner that the corn may be planted in check-rows.

The operation of my invention may be described as follows: Seed being placed in the hopper C', the plows $k$ being adjusted to the proper depth in the ground, and the wheel F' being in gear with the regular driving cog-wheel E', and the planter being made to move forward from a position of its working parts, as shown in Fig. 2, the cups $d'$ of the oscillating cylinders $d$ will receive the seed from the hopper C' and convey the same to the hoppers $b$. In the meantime the bar D will have been retracted, so that the seed delivered to the hopper $b$ is made to fall upon the surface of the bars. The planter continuing to operate, the bars D will be forced forward until the apertures $e$ are within the hoppers $b$, as shown in Fig. 2, and the seed contained therein will fall into the apertures $e$ of the bars. The cups $d'$ of the cylinders $d$ in the meantime have been made to return for another supply of seed. The feed-bars D will now be again retracted to the point of deposit, at which the valve $e'$ will open and allow the seed contained in the apertures to fall to the ground, as shown by red lines in Fig. 2. The seed falling in the furrows made by the plows $k$ will be properly covered by means of the wheels B B'.

Should it be discovered at any time that the corn is not being planted properly in check-rows, the wheels E' F' will be thrown out of gear and the wheels E F in gear, as before described. The planter will then be operated until the proper points of deposit are gained, when the wheels E' F' will be again thrown in gear and the planting continued, as before described.

When it is not desired to plant corn the wheels F F' will be thrown entirely out of gear with the wheels E E', the plows will be elevated, as before described, and the planter may be moved about without operating its working parts.

What I claim as my invention, and desire to secure by Letters Patent, is—

The cylinders $d\ d'$, in combination with the hoppers $C'\ b$, with reference to the feed-bar D, arranged to operate substantially as described.

In testimony of which invention I have hereunto set my hand in presence of two witnesses.

WILLIAM LEES.

Witnesses:
H. E. CLIFTON,
WM. P. EUSEY.